United States Patent
Yi et al.

(10) Patent No.: US 8,839,503 B2
(45) Date of Patent: Sep. 23, 2014

(54) METHOD FOR MANUFACTURING STATOR FOR ELECTRIC WATER PUMP

(75) Inventors: Jeawoong Yi, Hwaseong-si (KR); Seung Yong Lee, Yongin-si (KR); Gyuhwan Kim, Suwon-si (KR); Yun Seok Kim, Yongin-si (KR); Yong Sun Park, Yongin-si (KR); Tae-Sung Oh, Ansan-si (KR); Kyung-Hwan Kim, Incheon-si (KR); Jong-Hoon Lee, Incheon-si (KR); Kwang-Ho Lee, Cheonan-si (KR)

(73) Assignees: Hyundai Motor Company, Seoul (KR); Amotech Co., Ltd., Incheon-Si (KR); Myunghwa Ind. Co. Ltd., Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 12/877,270

(22) Filed: Sep. 8, 2010

(65) Prior Publication Data

US 2011/0116948 A1    May 19, 2011

(30) Foreign Application Priority Data

Nov. 19, 2009 (KR) ................. 10-2009-0112233

(51) Int. Cl.
*H02K 1/14* (2006.01)
*H02K 15/02* (2006.01)
*H02K 15/095* (2006.01)
*H02K 3/52* (2006.01)
*F04D 13/06* (2006.01)
*H02K 15/12* (2006.01)

(52) U.S. Cl.
CPC ............ *H02K 1/148* (2013.01); *H02K 15/12* (2013.01); *H02K 3/522* (2013.01); *F04D 13/064* (2013.01); *H02K 15/022* (2013.01)

USPC .............................. 29/596; 310/216.008

(58) Field of Classification Search
CPC . H02K 15/025; H02K 15/085; H02K 15/095; H02K 1/148
USPC .............. 29/596; 310/216.008, 216.009; 417/410.1
See application file for complete search history.

(56) References Cited

U.S. PATENT DOCUMENTS

| 2,713,311 A | 7/1955 | White |
| 2,718,193 A | 9/1955 | Zimsky |

(Continued)

FOREIGN PATENT DOCUMENTS

| CN | 1250554 A | 4/2000 |
| CN | 1307741 A | 8/2001 |

(Continued)

*Primary Examiner* — Livius R Cazan
(74) *Attorney, Agent, or Firm* — Morgan, Lewis & Bockius LLP

(57) ABSTRACT

A method for manufacturing a stator for an electric water pump may be used for manufacturing the stator used in the electric water pump. In the electric water pump which includes stator assembly for an electric water pump, wherein the stator assembly including a plurality of core-insulator assemblies generates a magnetic field according to a control signal and a rotor is rotated by the magnetic field generated at the stator assembly to pressurize coolant, the method for manufacturing the stator assembly may include a) stacking a plurality of pieces made of a magnetic material to form a core stack, b) molding an insulator to the core stack, c) coiling a coil to the insulator to form a core-insulator assembly so as to form a magnetic path, and d) connecting the respective core-insulator assembly in an annular shape in sequence to form the stator assembly.

7 Claims, 6 Drawing Sheets

(56) References Cited

U.S. PATENT DOCUMENTS

| | | |
|---|---|---|
| 2,906,208 A | 9/1959 | White |
| 2,925,041 A | 2/1960 | Miroslav |
| 3,053,189 A | 9/1962 | White |
| 3,135,211 A | 6/1964 | Pezzillo |
| 3,138,105 A | 6/1964 | White |
| 3,220,349 A | 11/1965 | White |
| 3,223,043 A | 12/1965 | Harris |
| 3,967,915 A | 7/1976 | Litzenberg |
| 4,080,112 A | 3/1978 | Zimmermann |
| 4,465,437 A | 8/1984 | Jensen et al. |
| 4,886,430 A | 12/1989 | Veronesi et al. |
| 4,890,988 A | 1/1990 | Kramer et al. |
| 5,009,578 A | 4/1991 | Hyland |
| 5,044,897 A | 9/1991 | Dorman |
| 5,129,795 A | 7/1992 | Hyland |
| 5,156,535 A | 10/1992 | Budris et al. |
| 5,160,246 A | 11/1992 | Horiuchi |
| 5,184,945 A | 2/1993 | Chi-Wei |
| 5,297,940 A | 3/1994 | Buse |
| 5,302,091 A | 4/1994 | Horiuchi |
| 5,407,331 A | 4/1995 | Atsumi |
| 5,464,333 A | 11/1995 | Okada et al. |
| 5,580,216 A | 12/1996 | Munsch |
| 5,830,258 A | 11/1998 | Yamashita et al. |
| 5,890,880 A | 4/1999 | Lustwerk |
| 5,915,931 A | 6/1999 | Lindner et al. |
| 5,924,851 A | 7/1999 | Obata et al. |
| 5,997,261 A | 12/1999 | Kershaw et al. |
| 6,012,909 A | 1/2000 | Sloteman et al. |
| 6,018,208 A | 1/2000 | Maher et al. |
| 6,027,318 A | 2/2000 | Shimanuki et al. |
| 6,036,456 A | 3/2000 | Peters et al. |
| 6,078,121 A | 6/2000 | Poag et al. |
| 6,082,974 A | 7/2000 | Takemoto et al. |
| 6,102,674 A | 8/2000 | Strauch et al. |
| 6,302,661 B1 | 10/2001 | Khanwilkar et al. |
| 6,350,109 B1 | 2/2002 | Brunet et al. |
| 6,447,269 B1 | 9/2002 | Rexroth et al. |
| 6,464,471 B1 | 10/2002 | Mathis et al. |
| 6,477,269 B1 | 11/2002 | Brechner |
| 6,722,854 B2 | 4/2004 | Forsberg |
| 6,817,845 B2 | 11/2004 | Angle et al. |
| 6,844,640 B2 | 1/2005 | Abe et al. |
| 6,884,043 B2 | 4/2005 | Kimberlin et al. |
| 6,896,494 B2 | 5/2005 | Sunaga et al. |
| 7,033,146 B2 | 4/2006 | Shi |
| 7,074,019 B2 | 7/2006 | Knoll |
| 7,221,073 B2 * | 5/2007 | Yamada et al. ........ 310/216.105 |
| 7,300,263 B2 | 11/2007 | Mitsuda et al. |
| 2002/0150486 A1 | 10/2002 | Cooper et al. |
| 2004/0037719 A1 | 2/2004 | Sunaga et al. |
| 2004/0062664 A1 | 4/2004 | Weigold et al. |
| 2004/0076532 A1 | 4/2004 | Miyazaki et al. |
| 2004/0115077 A1 | 6/2004 | Iwanari |
| 2005/0025642 A1 | 2/2005 | Deai |
| 2005/0254971 A1 | 11/2005 | Ohya et al. |
| 2006/0057002 A1 | 3/2006 | Nakanishi |
| 2006/0057005 A1 | 3/2006 | Williams et al. |
| 2006/0057006 A1 | 3/2006 | Williams et al. |
| 2006/0245956 A1 | 11/2006 | Lacroix et al. |
| 2007/0018521 A1 | 1/2007 | Ishiguro et al. |
| 2007/0086905 A1 | 4/2007 | Nagata et al. |
| 2007/0114867 A1 | 5/2007 | Marioni |
| 2007/0243086 A1 | 10/2007 | Sakai et al. |
| 2008/0019850 A1 | 1/2008 | Tajima et al. |
| 2008/0100165 A1 | 5/2008 | Alston et al. |
| 2008/0112824 A1 | 5/2008 | Sawasaki et al. |
| 2008/0219839 A1 | 9/2008 | Pfetzer et al. |

FOREIGN PATENT DOCUMENTS

| | | |
|---|---|---|
| CN | 1434557 A | 8/2003 |
| CN | 1484883 A | 3/2004 |
| CN | 1773122 A | 5/2006 |
| CN | 1952379 A | 4/2007 |
| CN | 200993106 Y | 12/2007 |
| CN | 101164218 A | 4/2008 |
| CN | 201332347 Y | 10/2009 |
| JP | 2-84032 A | 3/1990 |
| JP | 9-324787 A | 12/1997 |
| JP | 11-315172 A | 11/1999 |
| JP | 2000-69703 A | 3/2000 |
| JP | 2000-278924 A | 10/2000 |
| JP | 2000-299959 A | 10/2000 |
| JP | 2001-136700 A | 5/2001 |
| JP | 2001-314062 A | 11/2001 |
| JP | 2003-3984 A | 1/2003 |
| JP | 2004-88944 A | 3/2004 |
| JP | 2004-129369 A | 4/2004 |
| JP | 2004-512462 A | 4/2004 |
| JP | 2004-183595 A | 7/2004 |
| JP | 2004-282989 A | 10/2004 |
| JP | 2005-287149 A | 10/2005 |
| JP | 2006-257912 A | 9/2006 |
| JP | 2006-320050 A | 11/2006 |
| JP | 2007-14146 A | 1/2007 |
| JP | 2007-205246 A | 8/2007 |
| JP | 2007-318987 A | 12/2007 |
| JP | 2008-8222 A | 1/2008 |
| JP | 2008-175090 A | 7/2008 |
| JP | 2008-278684 A | 11/2008 |
| JP | 2009-177985 A | 8/2009 |
| JP | 2009-201294 A | 9/2009 |
| KR | 1998-062328 U | 11/1998 |
| KR | 2002-0064360 A | 8/2002 |
| KR | 10-2007-0053123 A | 5/2007 |
| KR | 10-0908396 B1 | 7/2009 |
| WO | WO 2008/123735 A1 | 10/2008 |
| WO | WO 2009/038302 A2 | 3/2009 |
| WO | WO 2009/056271 A1 | 5/2009 |

* cited by examiner

METHOD FOR MANUFACTURING STATOR FOR ELECTRIC WATER PUMP

CROSS-REFERENCE TO RELATED APPLICATION

The present application claims priority to Korean Patent Application No. 10-2009-0112233 filed on Nov. 19, 2009, the entire contents of which is incorporated herein for all purposes by this reference.

BACKGROUND OF THE INVENTION

1. Field of the Invention

The present invention relates to an electric water pump. More particularly, the present invention relates to an electric water pump having improved performance and durability.

2. Description of Related Art

Generally, a water pump circulates coolant to an engine and a heater in order to cool the engine and heat a cabin. The coolant flowing out from the water pump circulates through and exchanges heat with the engine, the heater, or the radiator, and flows back in the water pump. Such a water pump is largely divided into a mechanical water pump and an electric water pump.

The mechanical water pump is connected to a pulley fixed to a crankshaft of the engine and is driven according to rotation of the crankshaft (i.e., rotation of the engine). Therefore, the coolant amount flowing out from the mechanical water pump is determined according to rotation speed of the engine. However, the coolant amount required in the heater and the radiator is a specific value regardless of the rotation speed of the engine. Therefore, the heater and the radiator do not operate normally in a region where the engine speed is slow, and in order to operate the heater and the radiator normally, the engine speed must be increased. However, if the engine speed is increased, fuel consumption of a vehicle also increases.

On the contrary, the electric water pump is driven by a motor controlled by a control apparatus. Therefore, the electric water pump can determines the coolant amount regardless of the rotation speed of the engine. Since components used in the electric water pump, however, are electrically operated, it is important for electrically operated components to have sufficient waterproof performance. If the components have sufficient waterproof performance, performance and durability of the electric water pump may also improve.

Currently, the number of vehicles having an electric water pump is tending to increase. Accordingly, various technologies for improving performance and durability of the electric water pump are being developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an electric water pump having advantages of improved performance and durability.

A method for manufacturing a stator assembly for an electric water pump, wherein the stator assembly including a plurality of core-insulator assemblies generates a magnetic field according to a control signal and a rotor is rotated by the magnetic field generated at the stator assembly to pressurize coolant, may include a) stacking a plurality of pieces made of a magnetic material to form a core stack, b) molding an insulator to the core stack, c) coiling a coil to the insulator to form a core-insulator assembly so as to form a magnetic path, and d) connecting the respective core-insulator assembly in an annular shape in sequence to form the stator assembly.

The method may further include forming a mounting groove and a mounting protrusion to the insulator with the step b) or between the steps of b) and c).

The method may further include molding a stator case to the respective core-insulator assembly and the coil after the step d).

In another aspect of the present invention, the electric water pump apparatus, may include a plurality of core-insulator assemblies to generate a magnetic field according to a control signal, the core-insulator assemblies including a plurality of pieces made of a magnetic material to form a core stack molded by an insulator, wherein the insulator is coiled by a coil to form a core-insulator assembly so as to form a magnetic path, and the respective core-insulator assembly is coupled each other in an annular shape in sequence, and a rotor enclosed by the stator assembly and rotated by the magnetic field generated by the stator assembly to pressurize coolant.

The electric water pump apparatus may further include a stator case molded to the respective core-insulator assembly and the coil, wherein the stator case is made of a bulk mold compound including a potassium family that has a low coefficient of contraction.

The pieces may respectively have an exterior circumferential portion, an interior circumferential portion, and a connecting portion extending radially in order to connect the exterior circumferential portion to the interior circumferential portion, wherein the insulator has an exterior circumferential portion wrapping the exterior circumferential portion of the pieces, an interior circumferential portion wrapping the interior circumferential portion of the pieces, and a connecting portion wrapping the connecting portion of the pieces and connecting the exterior circumferential portion of the insulator to the interior circumferential portion of the insulator.

The circumferential thickness of the connecting portion in the pieces may be smaller than those of the exterior circumferential portion and the interior circumferential portion in the pieces.

One side of the interior circumferential portion of the insulator may be provided with a mounting groove and the other side of the interior circumferential portion of the insulator is provided with a mounting protrusion, wherein the plurality of core-insulator assemblies are connected with each other by inserting the mounting protrusion of one core-insulator assembly in the mounting groove of the other core-insulator assembly.

One side of the exterior circumferential portion of the insulator may be provided with a mounting groove and the other side of the exterior circumferential portion of the insulator is provided with a mounting protrusion, wherein the plurality of core-insulator assemblies are connected with each other by inserting the mounting protrusion of one core-insulator assembly in the mounting groove of the other core-insulator assembly.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
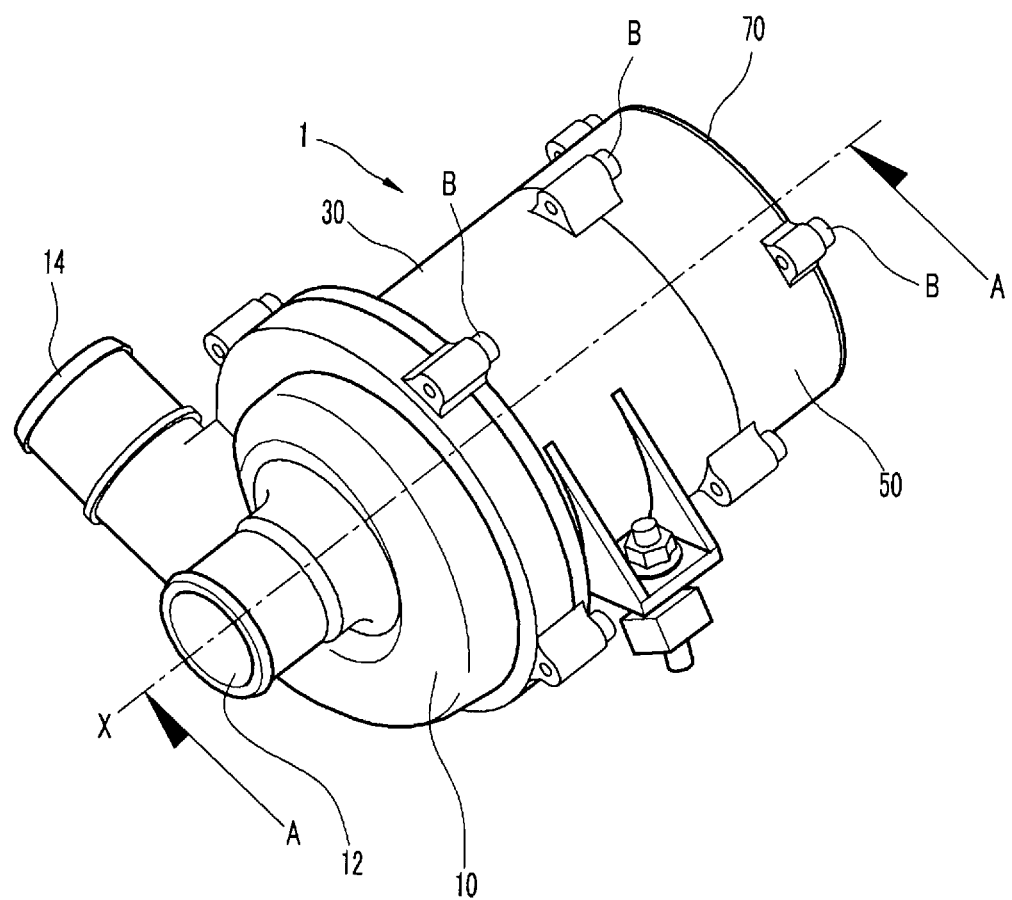
FIG. 1 is a perspective view of an electric water pump according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
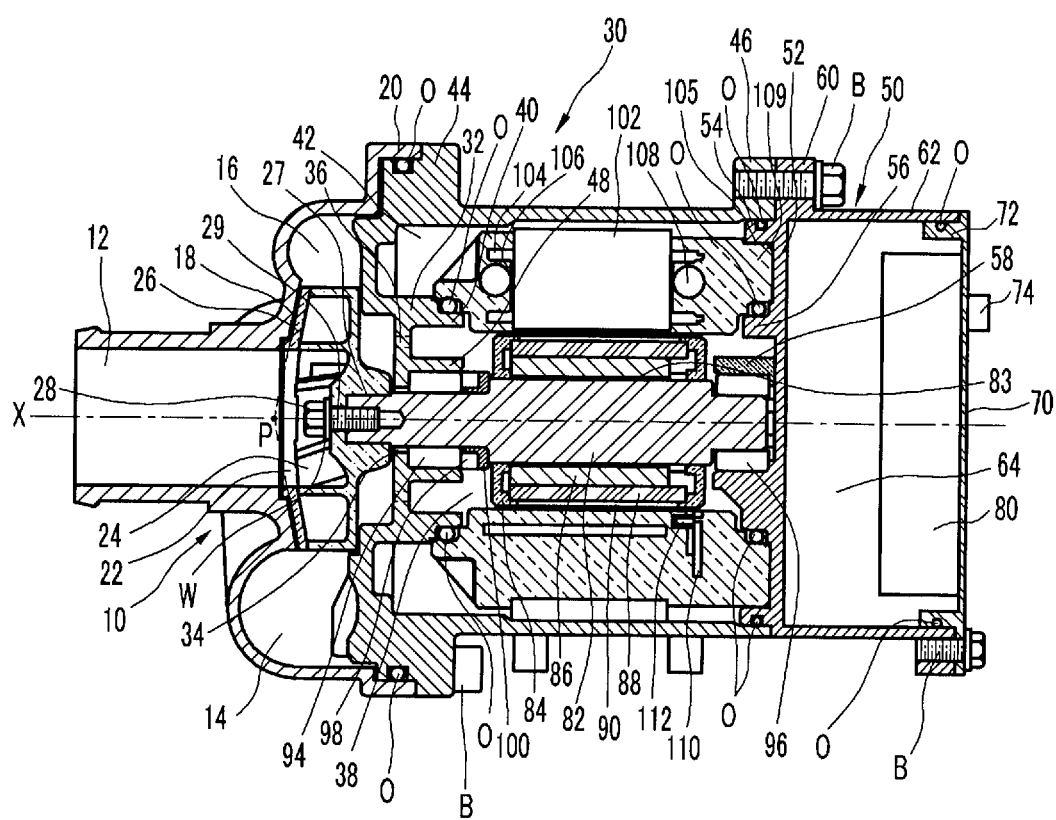
FIG. 2 is a cross-sectional view taken along the line A-A in FIG. 1.

FIG. 1 is a perspective view of an electric water pump according to an exemplary embodiment of the present invention, and FIG. 2 is a cross-sectional view taken along the line A-A in FIG. 1.

As shown in FIG. 1 and FIG. 2, an electric water pump 1 according to an exemplary embodiment of the present invention includes a pump cover 10, a body 30, a driver case 50, and a driver cover 70. The body 30 is engaged to a rear end of the pump cover 10 so as to form a volute chamber 16, the driver case 50 is engaged to a rear end of the body 30 so as to form a rotor chamber 38 and a stator chamber 42, and the driver cover 70 is engaged to a rear end of the driver case 50 so as to form a driver chamber 64.

In addition, an impeller 22 is mounted in the volute chamber 16, a rotor (84, 86, 88, and 90) fixed to a shaft 82 is mounted in the rotor chamber 38, a stator assembly 101 is mounted in the stator chamber 42, and a driver 80 is mounted in the driver chamber 64. The shaft 82 has a central axis x, and the rotor (84, 86 88, and 90) as well as the shaft 82 rotate about the central axis x. The stator assembly 101 is disposed coaxially with the central axis x of the shaft 82.

The pump cover 10 is provided with an inlet 12 at a front end portion thereof and an outlet 14 at a side portion thereof. Therefore, the coolant flows in the electric water pump 1 through the inlet 12, and the pressurized coolant in the electric water pump 1 flows out through the outlet 14. A slanted surface 18 is formed at a rear end portion of the inlet 12 of the pump cover 10, and a rear end portion 20 of the pump cover 10 is extended rearward from the slanted surface 18. The rear end portion 20 of the pump cover 10 is engaged to a cover mounting portion 44 of the body 30 by fixing means such as a bolt B. The slanted surface 18 is slanted with reference to the central axis x of the shaft 82, and an intersecting point P of lines extended from the slanted surface 18 is located on the central axis x of the shaft 82.

The volute chamber 16 for pressurizing the coolant is formed in the pump cover 10, and the impeller 22 for pressurizing and discharging the coolant through the outlet 14 is mounted in the volute chamber 16. The impeller 22 is fixed to a front end portion of the shaft 82 and rotates together with the shaft 82. For this purpose, a bolt hole 29 is formed at a middle portion of the impeller 22 and a thread is formed at an interior circumference of the bolt hole 29. Therefore, an impeller bolt 28 inserted in the bolt hole 29 is threaded to the front end portion of the shaft 82 such that the impeller 22 is fixed to the shaft 82. A washer w may be interposed between the impeller 22 and the impeller bolt 28.

The impeller 22 is provided with a confronting surface 26 corresponding to the slanted surface 18 at the front end portion thereof. Therefore, an intersecting point of lines extended from the confronting surface 26 is also positioned on the central axis x of the shaft 82. The coolant having flowed into the water pump 1 may be smoothly guided and performance of the water pump 1 may be improved as a consequence of disposing centers of the impeller 22 and the rotor (84, 86, 88, and 90) that are rotating elements of the water pump 1 and a center of the stator assembly 101 that is a fixed element of the water pump 1 on the central axis x.

In addition, the impeller 22 is divided into a plurality of regions by a plurality of blades 24. The coolant having flowed into the plurality of regions is pressurized by rotation of the impeller 22.

The body 30 has a hollow cylindrical shape that is opened rearward, and is engaged to the rear end of the pump cover 10. The body 30 includes a front surface 32 forming the volute chamber 16 with the pump cover 10, the stator chamber 42 that is formed at an external circumferential portion of the body 30 and in which the stator assembly 101 is mounted, and the rotor chamber 38 that is formed at an interior circumferential portion of the stator chamber 42 and in which the rotor (84, 86, 88, and 90) is mounted.

The front surface 32 of the body 30 is provided with the cover mounting portion 44, a first stator mounting surface 40, a first bearing mounting surface 48, and a penetration hole 34 formed sequentially from an exterior circumference to a center thereof.

The cover mounting portion 44 is engaged to the rear end portion 20 of the pump cover 10. Sealing means such as an O-ring O may be interposed between the cover mounting portion 44 and the rear end portion 20 in order to prevent leakage of the coolant from the volute chamber 16.

The first stator mounting surface 40 is protruded rearward from the front surface 32, and defines a boundary between the stator chamber 42 and the rotor chamber 38. In a state that the sealing means such as an O-ring O is mounted at the first stator mounting surface 40, the front end of the stator assembly 101 is mounted at the first stator mounting surface 40.

The first bearing mounting surface 48 is protruded rearward from the front surface 32. A first bearing 94 is interposed between the first bearing mounting surface 48 and the front end portion of the shaft 82 in order to make the shaft 82 smoothly rotate and to prevent the shaft 82 from being inclined.

The penetration hole 34 is formed at a middle portion of the front surface 32 such that the front end portion of the shaft 82 is protruded to the volute chamber 16 through the penetration hole 34. The impeller 22 is fixed to the shaft 82 in the volute chamber 16. It is exemplarily described in this specification that the impeller 22 is fixed to the shaft 82 by the impeller bolt 28. However, the impeller 22 may be press-fitted to an exterior circumference of the shaft 82.

Meanwhile, a connecting hole 36 is formed at the front surface 32 between the first stator mounting surface 40 and the first bearing mounting surface 48. Therefore, the rotor chamber 38 is fluidly connected to the volute chamber 16. Heat generated at the shaft 82, the rotor (84, 86, 88, and 90), and the stator assembly 101 by operation of the water pump 1 is cooled by the coolant flowing in and out through the connecting hole 36. Therefore, durability of the water pump 1 may improve. In addition, floating materials in the coolant are prevented from being accumulated in the rotor chamber 38.

The rotor chamber 38 is formed at a middle portion in the body 30. The shaft 82 and the rotor (84, 86, 88, and 90) is mounted in the rotor chamber 38.

A stepped portion 83, the diameter of which is larger than that of the other part, is formed at a middle portion of the shaft 82. According to an exemplary embodiment of the present invention, a hollow shaft 82 may be used.

The rotor (84, 86, 88, and 90) is fixed on the stepped portion 83 of the shaft 82, and is formed in an unsymmetrical shape. Thrust is exerted on the shaft 82 toward the front surface 32 by the unsymmetrical shape of the rotor (84, 86, 88, and 90) and a pressure difference between the volute chamber 16 and the rotor chamber 38. The thrust generated at the shaft 82 pushes the shaft 82 toward the front surface 32. Thereby, the stepped portion 83 of the shaft 82 may be interfere and collide with the first bearing 94 and the first bearing 94 may be damaged, accordingly. In order to prevent interference and collision of the stepped portion 83 of the shaft 82 and the first bearing 94, a cup 100 is mounted between the stepped portion 83 of the shaft 82 and the first bearing 94. Such a cup 100 is made of an elastic rubber material, and relieves the thrust of the shaft 82 exerted to the first bearing 94.

Meanwhile, in a case that the cup 100 directly contacts the first bearing 94, the thrust of the shaft 82 exerted to the first bearing 94 can be relieved. However, rotation friction may be generated between the first bearing 94 and the cup 100 of a rubber material, and thereby performance of the water pump 1 may be deteriorated. Therefore, a thrust ring 98 is mounted between the cup 100 and the first bearing 94 in order to reduce the rotation friction between the first bearing 94 and the cup 100. That is, the cup 100 reduces the thrust of the shaft 82 and the thrust ring 98 reduces the rotation friction of the shaft 82. It is exemplarily described in this specification that a groove is formed at an exterior circumference of the cup 100 and the thrust ring 98 is mounted in the groove. However, a method for installing the thrust ring 98 to the cup 100 is not limited to the exemplary embodiment of the present invention. For example, a groove may be formed at a middle portion of the cup 100 and the thrust ring 98 may be mounted in this groove.

Further, it is to be understood that any thrust ring 98 interposed between the cup 100 and the first bearing 94 may be included in the spirit of the present invention.

The rotor (84, 86, 88, and 90) includes a rotor core 86, a permanent magnet 88, a rotor cover 84, and a rotor case 90.

The magnetic rotor core 86 has a cylindrical shape and is fixed to the stepped portion 83 of the shaft 82 by press-fitting or welding. The rotor core 86 is provided with a plurality of recesses (not shown) formed along a length direction thereof at an exterior circumference thereof, and the permanent magnet 88 is insertedly mounted in each recesses.

The permanent magnet 88 is mounted at the exterior circumference of the rotor core 86.

A pair of rotor covers 84 are mounted at both ends of the rotor core 86 and the permanent magnet 88. The rotor cover 84 primarily fixes the rotor core 86 and the permanent magnet 88, and is made of copper or stainless steel that has high specific gravity.

In a state in which the rotor core 86 and the permanent magnet 88 are mounted to the rotor cover 84, the rotor case 90 wraps exterior circumferences of the rotor core 86 and the permanent magnet 88 so as to secondarily fix them. The rotor case 90 is made of a bulk mold compound (BMC) including a potassium family that has a low coefficient of contraction. A method for manufacturing the rotor case 90 will be briefly described.

The rotor core 86 and the permanent magnet 88 are mounted to the rotor cover 84, and the rotor cover 84 to which the rotor core 86 and the permanent magnet 88 are mounted is inserted in a mold (not shown). After that, the bulk mold compound including the potassium family is melted and high temperature (e.g., 150° C.) and high pressure BMC is flowed into the mold. Then, the BMC is cooled in the mold. As described above, if the rotor case 90 is made of BMC having the low coefficient of contraction, the rotor case 90 can be precisely manufactured. In general, the coefficient of contraction of a resin is 4/1000-5/1000, but the coefficient of contraction of the BMC is about 5/10,000. If the rotor case 90 is manufactured by flowing the high temperature resin into the mold, the rotor case 90 is contracted and does not have a target shape. Therefore, if the rotor case 90 is manufactured by the BMC including the potassium family that has the low coefficient of contraction, contraction of the rotor case 90 by cooling may be reduced and the rotor case 90 may be precisely manufactured. In addition, since BMC including the potassium family has good heat-radiating performance, the rotor can be cooled independently. Therefore, the water pump may be prevented from being heat damaged.

In addition, according to a conventional method for manufacturing the rotor, the permanent magnet is fixed to the exterior circumference of the rotor core with glue. However, as the rotor rotates, high temperature and high pressure are generated near the rotor. Thereby, the glue may be melted or the permanent magnet may be disengaged from the rotor core. The permanent magnet 88 mounted to the rotor core 86, on the contrary, is fixed primarily by the rotor cover 84 and secondarily by the rotor case 90 according to an exemplary embodiment of the present invention. Thus, the permanent magnet 88 may not be disengaged from the rotor core 86.

The stator chamber 42 is formed in the body 30 at a radially outer portion of the rotor chamber 38. The stator assembly 101 is mounted in the stator chamber 42.

The stator assembly 101 is fixed to the body 30 directly or indirectly, and includes a stator core 102, an insulator 104, a coil 108, and a stator case 109.

The stator core 102 is formed by stacking a plurality of pieces 150 made of a magnetic material. That is, the plurality of thin pieces is stacked up such that the stator core 102 has a target thickness.

The insulator 104 connects the pieces making up the stator core 102 to each other, and is formed by molding a resin. That is, the stator core 102 formed by stacking the plurality of pieces is inserted in a mold (not shown), and then molten resin is injected into the mold. Thereby, the stator core 102 at which the insulator 104 is mounted is manufactured. At this time, coil mounting recesses 106 are formed at front and rear end portions of the stator core 102 and the insulator 104.

The coil 108 is coiled at an exterior circumference of the stator core 102 so as to form a magnetic path.

The stator case 109 wraps and seals the stator core 102, the insulator 104, and the coil 108. The stator case 109, the same as the rotor case 90, is manufactured by insert molding the BMC including the potassium family.

In addition, when the stator case 109 is insert molded, a Hall sensor 112 and a Hall sensor board 110 may also be insert molded. That is, the stator 101, the Hall sensor 112, and the Hall sensor board 110 may be integrally manufactured as one component.

The Hall sensor 112 detects the position of the rotor (84, 86, 88, and 90). A mark (not shown) for representing the position thereof is formed at the rotor (84, 86, 88, and 90), and the Hall sensor 112 detects the mark in order to detect the position of the rotor (84, 86, 88, and 90).

The Hall sensor board 110 controls a control signal delivered to the stator assembly 101 according to the position of the rotor (84, 86, 88, and 90) detected by the Hall sensor. That is, the Hall sensor board 110 makes a strong magnetic field be generated at one part of the stator assembly 101 and a weak magnetic field be generated at the other part of the stator assembly 101 according to the position of the rotor (84, 86, 88, and 90). Thereby, initial mobility of the water pump 1 may be improved.

A case mounting portion 46 is formed at an exterior surface of the rear end of the body 30.

The driver case 50 is engaged to the rear end of the body 30, and is formed of a case surface 52 at a front end portion thereof. The rotor chamber 38 and the stator chamber 42 are formed in the body 30 by engaging the driver case 50 to the rear end portion of the body 30. A body mounting portion 60 is formed at an external circumference of the front end portion of the driver case 50 and is engaged to the case mounting portion 46 by fixing means such as a bolt B.

The case surface 52 is provided with an insert portion 54, a second stator mounting surface 56, and a second bearing mounting surface 58 formed sequentially from an exterior circumference to a center thereof.

The insert portion 54 is formed at an external circumferential portion of the case surface 52 and is protruded forward. The insert portion 54 is inserted in and closely contacted to the rear end portion of the body 30. Sealing means such as an O-ring O is interposed between the insert portion 54 and the rear end portion of the body 30 so as to close and seal the stator chamber 42.

The second stator mounting surface 56 is protruded forward from the case surface 52 so as to define the boundary between the stator chamber 42 and the rotor chamber 38. The rear end of the stator assembly 101 is mounted at the second stator mounting surface 56 with a sealing means such as an O-ring O being interposed. The stator chamber 42 is not fluidly connected to the rotor chamber 38 by the O-ring O interposed between the first stator mounting surface 40 and the front end of the stator assembly 101 and the O-ring O interposed between the second stator mounting surface 56 and the rear end of the stator 101. Therefore, the coolant having flowed in the rotor chamber 38 does not flow to the stator chamber 42.

The second bearing mounting surface 58 is protruded forwardly from the case surface 52. A second bearing 96 is interposed between the second bearing mounting surface 58 and the rear end portion of the shaft 82 so as to make the shaft 82 smoothly rotate and to prevent the shaft 82 from being inclined.

The rear end of the driver case 50 is open. The driver chamber 64 is formed between the driver case 50 and the driver cover 70 by engaging the driver cover 70 of a disk shape to the rear end of the driver 50 by fixing means such as a bolt B. For this purpose, a protruding portion 72 is protruded forward from an exterior circumference of the driver cover 70, and this protruding portion 72 is inserted in and closely contacted to an exterior circumference 62 of the rear end of the driver case 50. Sealing means such as an O-ring O is interposed between the protruding portion 72 and the exterior circumference 62 so as to prevent foreign substances such as dust from entering the driver chamber 64.

The driver 80 controlling operation of the water pump 1 is mounted in the driver chamber 64. The driver 80 includes microprocessors and a printed circuit board (PCB). The driver 80 is electrically connected to a controller (not shown) disposed at an exterior of the electric water pump 1 through a connector 74 and receives a control signal of the controller. In addition, the driver 80 is electrically connected to the Hall sensor board 110 so as to transmit the control signal received from the controller to the Hall sensor board 110.

Meanwhile, the driver chamber 64 is isolated from the rotor chamber 38 by the case surface 52. Therefore, the coolant in the rotor chamber 38 does not flow into the driver chamber 64.

Hereinafter, the stator assembly 101 of the electric water pump 1 according to an exemplary embodiment of the present invention will be described in further detail with reference to FIG. 3.

Figure 3:
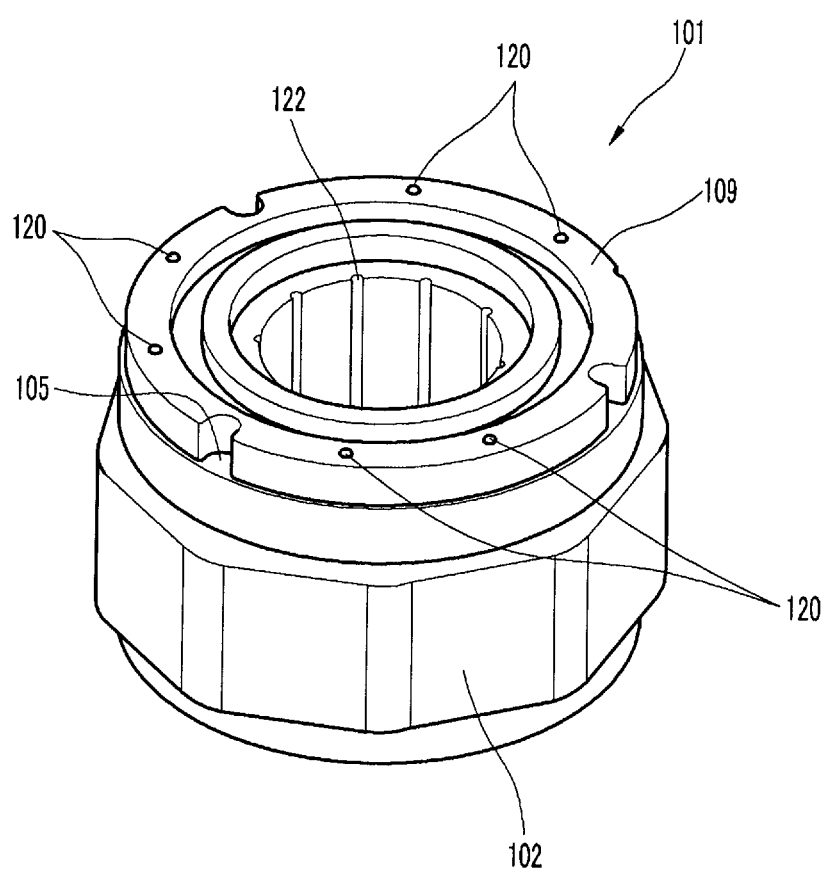
FIG. 3 is a perspective view showing a stator of an electric water pump according to an exemplary embodiment of the present invention.

FIG. 3 is a perspective view showing a stator of an electric water pump according to an exemplary embodiment of the present invention.

As shown in FIG. 3, a plurality of fixing grooves 105 are formed at the external circumference of the rear end of the stator case 109. The insert portion 54 is inserted in the fixing groove 105 so as to limit rotational and axial movements of the stator assembly 101 according to the rotation of the rotor (84, 86, 88, and 90). Such a fixing groove 105 can be formed together with the stator case 109 when the stator case 109 is insert molded, and an additional process or an additional device is not required for forming the fixing groove 105. Therefore, processes for manufacturing the stator assembly 101 do not increase. In addition, since the stator assembly 101 is fixed to the body 30 neither with glue nor by press-fitting, the stator assembly 101 can be easily disassembled from the body 30. Therefore, if the stator assembly 101 is out of order, the stator assembly 101 can be easily replaced.

In addition, as shown in FIG. 2, the interior circumference of the stator case 109 forms a part of the rotor chamber 38. As described above, the coolant flows into the rotor chamber 38 and moves in the rotor chamber 38 by rotation of the shaft 82 and the rotor (84, 86, 88, and 90). Since a stator groove 122 is formed at the interior circumference of the stator case 109 along the length direction thereof, the coolant in the rotor chamber 38 flows along the stator groove 122 and removes floating materials attached to the interior circumference of the stator case 109. The shape of the stator groove 122 can be easily determined by a person of ordinary skill in the art considering the flow of the coolant in the rotor chamber 38.

Further, in order to reduce vibration and noise according to the rotation of the rotor (84, 86, 88, and 90) and to reduce vibration generated when a vehicle drives, a plurality of damping holes 120 are formed at the stator case 109. Vibration and noise according to the rotation of the rotor (84, 86, 88, and 90) and vibration generated when the vehicle drives are absorbed by movement of gas in the stator chamber 42 through the damping hole 120. The position and shape of the damping hole 120 can be easily determined by a person of ordinary skill in the art according to vibration frequency and pressure frequency of the stator 101. In addition, a frothing resin or sound absorbing material may be filled in the damping hole 120 so as to further reduce vibration and noise.

Meanwhile, the stator groove 122 and the damping hole 120 may be formed at the rotor (84, 86, 88, and 90). That is, grooves (not shown) may be formed at the exterior circumference of the rotor case 90 such that the coolant in the rotor chamber 38 flows along the grooves and removes the floating materials attached to the exterior circumference of the rotor case 90. In addition, vibration and noise according to the rotation of the rotor (84, 86, 88, and 90) and vibration when the vehicle drives may be absorbed by forming holes (not shown) at the rotor case 90.

Figure 4:
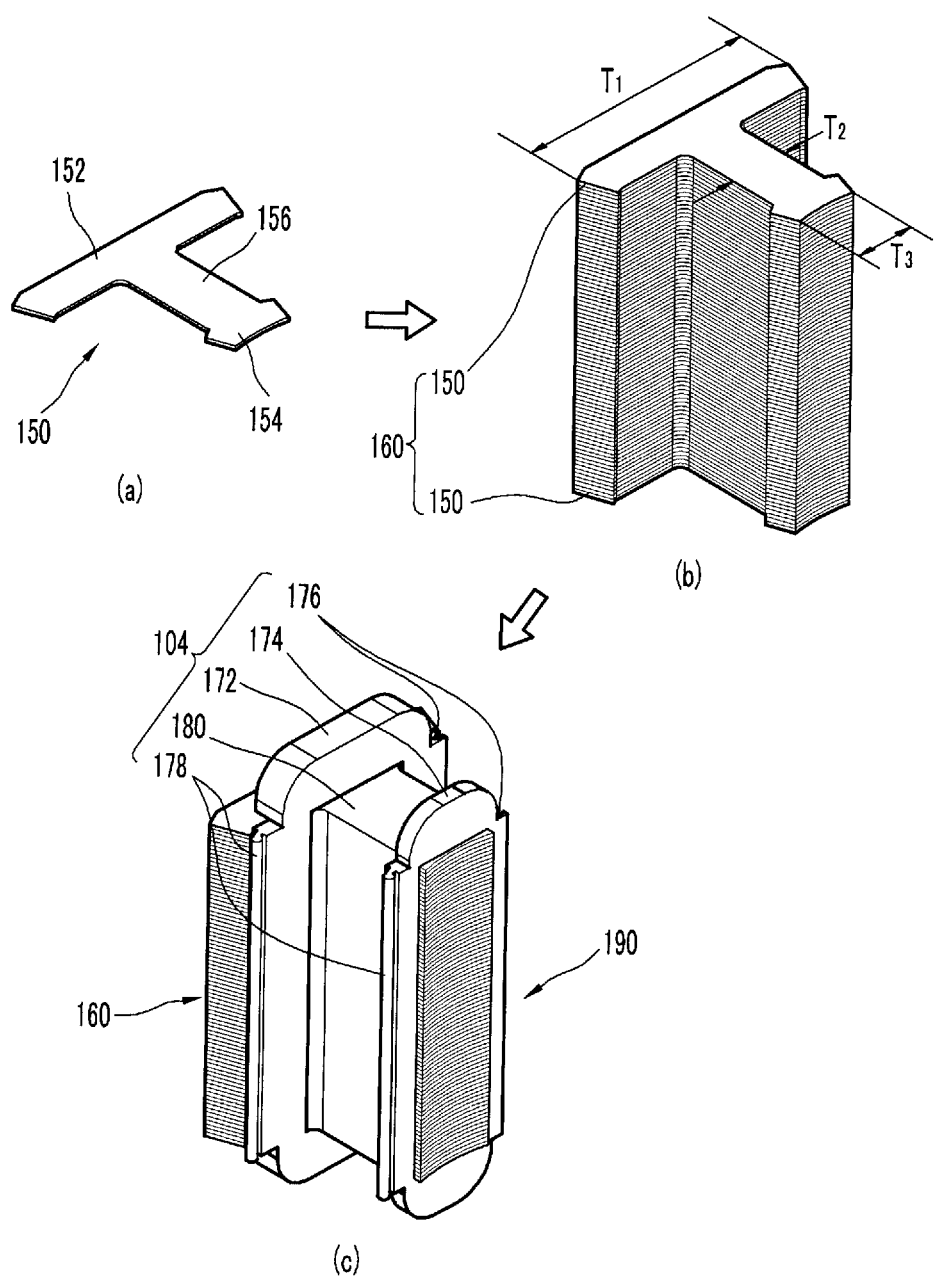
FIG. 4 is a schematic diagram showing processes for manufacturing a core-insulator assembly by molding an insulator to a core stack in an electric water pump according to an exemplary embodiment of the present invention.
Figure 5:
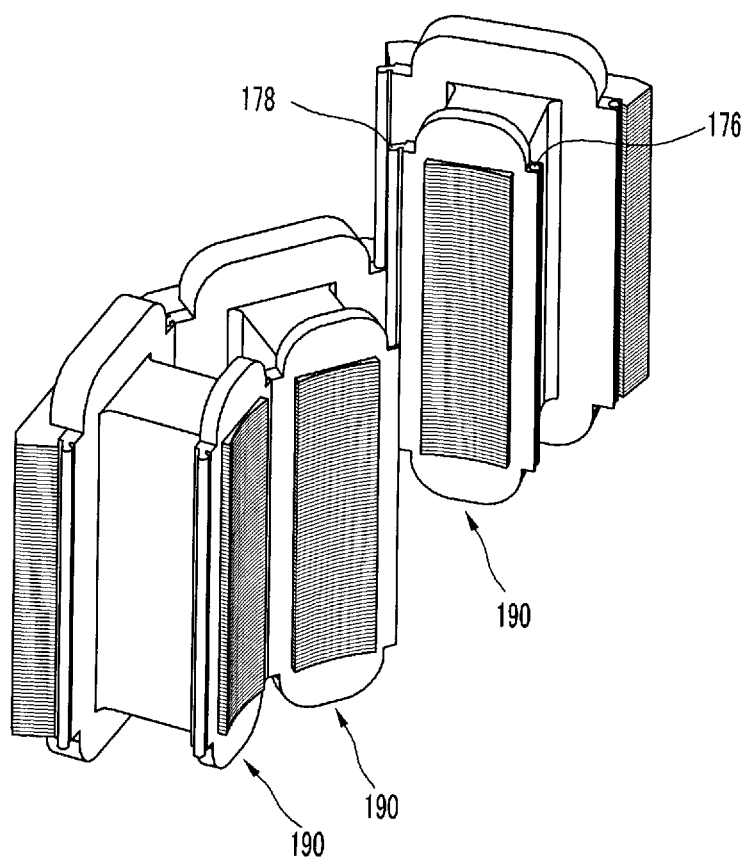
FIG. 5 is a schematic diagram showing processes for connecting core-insulator assemblies with each other in an electric water pump according to an exemplary embodiment of the present invention.
Figure 6:
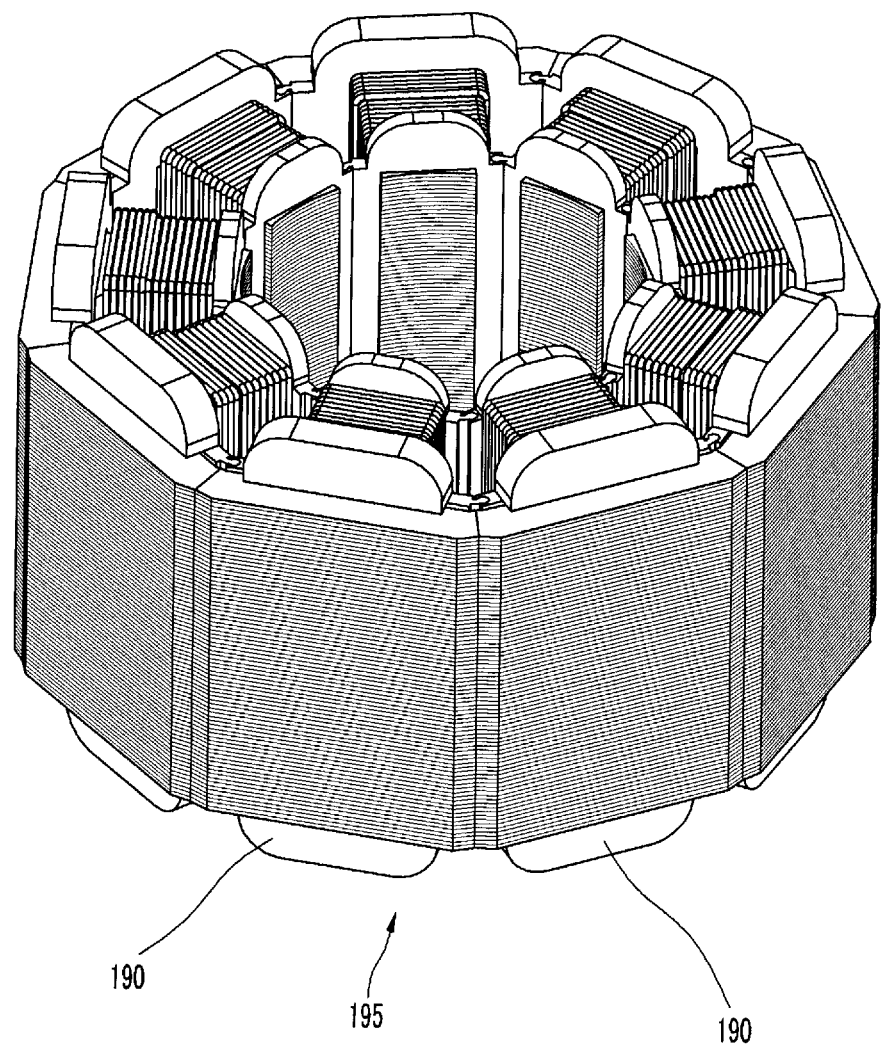
FIG. 6 is a perspective view of stator assembly which is manufactured by connecting core-insulator assemblies with each other in an electric water pump according to an exemplary embodiment of the present invention.

Referring to FIG. 4 to FIG. 6, a method for manufacturing a stator for an electric water pump according to an exemplary embodiment of the present invention will be described in detail.

FIG. 4 is a schematic diagram showing processes for manufacturing a core-insulator assembly by molding an insulator to a core stack in an electric water pump according to an exemplary embodiment of the present invention, FIG. 5 is a schematic diagram showing processes for connecting core-insulator assemblies with each other in an electric water pump according to an exemplary embodiment of the present invention, and FIG. 6 is a perspective view of stator assembly which is manufactured by connecting core-insulator assemblies with each other in an electric water pump according to an exemplary embodiment of the present invention.

As shown in FIG. 4 to FIG. 6, the stator core 102 including a plurality of coil insulator assemblies 190 is manufactured by connecting coil insulator assemblies 190 with each other in order to have an annular shape, and each core stack 160 in a coil insulator assembly 190 is formed by stacking the plurality of the pieces 150.

Each piece 150 includes an exterior circumferential portion 152 forming an exterior circumferential portion of the core stack 160, an interior circumferential portion 154 forming an interior circumferential portion of the core stack 160, and a connecting portion 156 extending radially in order to connect the exterior circumferential portion 152 to the interior circumferential portion 154. Circumferential thickness T2 of the connecting portion 156 is smaller than those T1 and T3 of the exterior circumferential portion 152 and the interior circumferential portion 154. The coil 108 is coiled at the connecting portion 156.

When the core stack 160 is manufactured as described above, a core-insulator assembly 190 is formed by molding the insulator 104 to the core stack 160. Shape of the core-insulator assembly 190 corresponds to that of each piece 150. That is, the insulator 104 includes an exterior circumferential portion 172 wrapping the exterior circumferential portion of the core stack 160, an interior circumferential portion 174 wrapping the interior circumferential portion of the core stack 160, and a connecting portion 180 wrapping the connecting portion of the core stack 160 and connecting the exterior circumferential portion 172 of the insulator 104 to the interior circumferential portion 174 of the insulator 104. The exterior circumferential portion 172, the interior circumferential portion 174, and the connecting portion 180 of the insulator 104 respectively have similar shapes to the exterior circumferential portion 152, the interior circumferential portion 154, and the connecting portion 156 of the pieces 150. Therefore, circumferential thickness of the connecting portion 180 of the insulator 104 is smaller than those of the exterior circumferential portion 172 and the interior circumferential portion 174 of the insulator 104. Such a connecting portion 180 provides a space at which the coil 108 is coiled.

A mounting groove 176 is formed at one side of the exterior circumferential portion 172 of the insulator 104, and a mounting protrusion 178 is formed at the other side of the exterior circumferential portion 172 of the insulator 104. In addition, a mounting groove 176 is formed at one side of the interior circumferential portion 174 of the insulator 104, and a mounting protrusion 178 is formed at the other side of the interior circumferential portion 174 of the insulator 104. The core-insulator assemblies 190 are connected to each other in order to form an annular stator assembly 195 by inserting the mounting protrusion 178 formed at the exterior circumferential portion 172 of one insulator 104 in the mounting groove 176 formed at the exterior circumferential portion 172 of other insulator 104 and by inserting the mounting protrusion 178 formed at the interior circumferential portion 174 of one insulator 104 in the mounting groove 176 formed at the interior circumferential portion 174 of other insulator 104. In addition, the mounting groove 176 and the mounting protrusion 178 may be formed at either of the exterior circumferential portion 172 and the interior circumferential portion 174 of the insulator 104.

The insulator 104 is made of insulating material and prevents the coil 108 from being contacted to the core stack 160. Therefore, the insulator 104 cannot be molded to an entire part of the core stack 160. In addition, the insulator 104 may be molded to a portion at which the coil 108 is coiled.

According to a conventional method for manufacturing a stator, pieces of a stator core are directly connected to each other so as to form the stator core. After that, an insulator is molded to the stator core. In this case, connecting means for connecting the pieces with each other must be provided at each thin pieces of the stator core. Thus, defect rate of the stator core may be high. However, according to an exemplary embodiment of the present invention, the mounting groove 176 and the mounting protrusion 178 are formed at the insulator 104 when or after the insulator 104 is molded to the core stack 160 to form the coil insulator assembly 190. Therefore, processes for manufacturing the stator may be performed with accuracy, and defect rate may be noticeably lowered.

According to an exemplary embodiment of the present invention, when the insulator 104 is molded to the core stack 160 to form the coil insulator assembly 190, the coil 108 is coiled at the connecting portion 180 of the insulator 104. After that, the plurality of core-insulator assemblies 190 at which the coil 108 is respectively coiled are connected to each other in order to form an annular stator assembly 195.

According to a conventional method for manufacturing a stator, a coil is coiled after an insulator is molded to a stator core. However, the core-insulator assemblies 190 are connected to each other after the coil is coiled to the core-insulator assembly 190 according to an exemplary embodiment of the present invention. Therefore, since more coils can be coiled to a predetermined volume, output may be enhanced.

Since a stator and a rotor that are electrically operated are wrapped by a resin case having waterproof performance according to an exemplary embodiment of the present invention, performance and durability of an electric water pump may improve.

In addition, since a Hall sensor and a Hall sensor board are mounted in the stator and a control signal is changed according to an initial position of the rotor, initial mobility of the electric water pump may improve.

Further, since the coolant flows in a rotor chamber where the rotor is mounted, the rotor may be cooled and foreign materials in the rotor chamber may be removed.

Since materials attached to the stator are removed by flow of the coolant in the rotor chamber, performance of the water pump may further improve.

In addition, vibration and noise may be reduced by means of damping holes formed at a stator case.

For convenience in explanation and accurate definition in the appended claims, the terms "interior" and "exterior" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing a stator assembly for an electric water pump, wherein the stator assembly generates a magnetic field according to a control signal and a rotor is rotated by the magnetic field generated at the stator assembly to pressurize coolant, the method for manufacturing the stator assembly comprising:
   a) stacking a plurality of pieces made of a magnetic material to form a core stack;
   b) molding an insulator to the core stack;
   c) coiling a coil to the insulator to form a single core-insulator assembly so as to form a magnetic path; and
   d) connecting a plurality of single core-insulator assemblies in an annular shape in sequence in a circumferential direction to form the stator assembly;
   wherein a mounting groove and a mounting protrusion are formed to the insulator with the step b) or between the steps of b) and c);
   wherein the insulator includes an interior circumferential portion,
   wherein one lateral side of the interior circumferential portion of the insulator is provided with the mounting groove along a full length of the lateral side in an axial direction of the stator assembly, and
       wherein the other lateral side of the interior circumferential portion of the insulator is provided with the mounting protrusion along a full length of the other lateral side thereof in the axial direction of the stator assembly; and
   wherein the plurality of single core-insulator assemblies are connected with each other by inserting, in the axial direction of the stator assembly, the mounting protrusion of one single core-insulator assembly in into the mounting groove of an adjacent single core-insulator assembly.

2. The method of claim 1, further comprising molding a stator case to the plurality of single core-insulator assemblies and the coil after the step d).

3. The method of claim 2, wherein the stator case is made of a bulk mold compound including potassium.

4. The method of claim 1, wherein the pieces respectively have an exterior circumferential portion, an interior circumferential portion, and a connecting portion extending radially in order to connect the exterior circumferential portion to the interior circumferential portion, and
   wherein the insulator has:
       an exterior circumferential portion wrapping the exterior circumferential portion of the pieces;
       the interior circumferential portion wrapping the interior circumferential portion of the pieces; and
       a connecting portion wrapping the connecting portion of the pieces and connecting the exterior circumferential portion of the insulator to the interior circumferential portion of the insulator.

5. The method of claim 4, wherein circumferential thickness of the connecting portion in the pieces is smaller than those of the exterior circumferential portion and the interior circumferential portion in the pieces.

6. A method for manufacturing a stator assembly for an electric water pump, wherein the stator assembly generates a magnetic field according to a control signal and a rotor is rotated by the magnetic field generated at the stator assembly to pressurize coolant, the method for manufacturing the stator assembly comprising:
   a) stacking a plurality of pieces made of a magnetic material to form a core stack;
   b) molding an insulator to the core stack;
   c) coiling a coil to the insulator to form a single core-insulator assembly so as to form a magnetic path; and
   d) connecting a plurality of single core-insulator assemblies in an annular shape in sequence in a circumferential direction to form the stator assembly;
   wherein a mounting groove and a mounting protrusion are formed to the insulator with the step b) or between the steps of b) and c);
   wherein the insulator includes an exterior circumferential portion,
   wherein one lateral side of the exterior circumferential portion of the insulator is provided with the mounting groove along a full length of the one lateral side in an axial direction of the stator assembly,
   wherein the other lateral side of the exterior circumferential portion of the insulator is provided with the mounting protrusion along a full length of the other lateral side in the axial direction of the stator assembly; and
   wherein the plurality of single core-insulator assemblies are connected with each other by inserting, in the axial direction of the stator assembly, the mounting protrusion of one single core-insulator assembly in the mounting groove of an adjacent single core-insulator assembly.

7. The method of claim 6, wherein the pieces respectively have an exterior circumferential portion, an interior circumferential portion, and a connecting portion extending radially in order to connect the exterior circumferential portion to the interior circumferential portion, and
   wherein the insulator has the exterior circumferential portion wrapping the exterior circumferential portion of the pieces, an interior circumferential portion wrapping the interior circumferential portion of the pieces, and a connecting portion wrapping the connecting portion of the pieces and connecting the exterior circumferential portion of the insulator to the interior circumferential portion of the insulator.

* * * * *